US008075408B2

(12) United States Patent
Hwang

(10) Patent No.: US 8,075,408 B2
(45) Date of Patent: Dec. 13, 2011

(54) MODULAR VISUAL OUTPUT COMPONENT

(75) Inventor: John Shi Feng Hwang, Bexley (AU)

(73) Assignee: Aristocrat Technologies Australia Pty. (AU)

( * ) Notice: Subject to any disclaimer, the term of this patent is extended or adjusted under 35 U.S.C. 154(b) by 413 days.

(21) Appl. No.: 12/057,114

(22) Filed: Mar. 27, 2008

(65) Prior Publication Data

US 2008/0242408 A1 Oct. 2, 2008

(30) Foreign Application Priority Data

Mar. 28, 2007 (AU) ................................ 2007901652

(51) Int. Cl.
*A63F 13/00* (2006.01)

(52) U.S. Cl. ................ 463/46; 463/20; 463/31; 463/47; 273/138.2; 273/141 A; 273/142 B; 116/202; 345/48; 345/84; 362/559; 362/611; 362/612

(58) Field of Classification Search ................ 463/3, 20, 463/30, 31; 273/138.1, 138.2, 141 A, 142 B, 273/142 C; 446/91; 40/541; 116/7, 202; 257/80, 82–83, 88, 95, 228, 257; 345/44, 345/46, 48, 82, 84, 180, 182–183, 207; 362/611–612, 555, 559, 582; 434/3, 76; 472/61
See application file for complete search history.

(56) References Cited

U.S. PATENT DOCUMENTS 3,728,708 A * 4/1973 Culbertson ............... 340/323 R
3,868,671 A * 2/1975 Maguire et al. ........... 340/323 R
5,521,587 A * 5/1996 Sawabe et al. ........... 340/815.45
5,605,506 A * 2/1997 Hoorn et al. .................... 463/42
5,767,818 A * 6/1998 Nishida .......................... 345/1.1
5,914,698 A * 6/1999 Nicholson et al. ............. 345/1.3
5,963,126 A * 10/1999 Karlin et al. .................. 340/321
6,634,124 B1 * 10/2003 Bierschbach ................... 40/452
6,814,610 B2 * 11/2004 Kurose et al. ................. 439/507
7,014,336 B1 * 3/2006 Ducharme et al. ............ 362/231
7,014,563 B2 * 3/2006 Stephan et al. ................. 463/47
7,019,723 B2 * 3/2006 Tsuji ............................... 345/87
7,355,562 B2 * 4/2008 Schubert et al. ............... 345/1.3
7,390,257 B2 * 6/2008 Paulsen et al. .................. 463/16
7,397,068 B2 * 7/2008 Park et al. ....................... 257/88
7,442,125 B2 * 10/2008 Paulsen et al. .................. 463/30
7,587,178 B2 * 9/2009 Marquardt ................... 455/90.3
7,591,559 B2 * 9/2009 Kurosaki ........................ 353/94
7,726,860 B2 * 6/2010 Harrity et al. ................. 362/555
2004/0053663 A1 3/2004 Paulsen et al.
2005/0261057 A1 11/2005 Bleich et al.
2005/0264473 A1 * 12/2005 Sibbett ............................ 345/44
2006/0121967 A1 6/2006 Paulsen et al.
2007/0020572 A1 * 1/2007 Furner et al. .................. 431/289

FOREIGN PATENT DOCUMENTS

WO WO 2006/122738 A1 11/2006

* cited by examiner

*Primary Examiner* — Arthur O. Hall
(74) *Attorney, Agent, or Firm* — McAndrews, Held & Malloy, Ltd.

(57) ABSTRACT

In a first aspect there is provided a modular visual output component for a gaming machine, including a housing, at least one visual output device, an input connector electrically coupled to the visual output device, and an output connector electrically coupled to the input connector. The input and output connectors being arranged relative to the housing and shaped such that the output connector can be connected to an input connector of a further modular visual output component having the same configuration with the modular visual output components abutting one another, whereby two or more modular visual output components can be joined to one another and supplied from a common power source.

11 Claims, 9 Drawing Sheets

MODULAR VISUAL OUTPUT COMPONENT

RELATED APPLICATIONS

This application claims priority to Australian Provisional Patent Application No. 2007901652, filed Mar. 28, 2007, entitled "A Modular Visual Output Component." The foregoing application is herein incorporated by reference in its entirety.

BACKGROUND OF THE INVENTION

The present invention generally relates to a modular visual output component, a visual output apparatus, and a visual output kit.

Some gaming machines are provided with a light tower (sometimes known as a "Candle") mounted to the top of the gaming machine. Such light towers have a plurality of different coloured lights provided by a monochromatic lens in the desired colour and a filament lamp for lighting the lens. These provide discrete lights which are lit in response to the operating state of the machine such as a fault or a security breach or in response to a player request for a personal service such as collecting a jackpot payout or ordering a beverage.

Each different coloured light confers a different meaning which may be dependent on the venue or gaming regulations of the jurisdiction within which the gaming machine is located. Similarly, the order of the coloured lights may also be subject to variation based on the venue or the jurisdictions regulations.

Accordingly, current light towers are custom-built.

SUMMARY OF THE INVENTION

In a first aspect there is provided a modular visual output component for a gaming machine, comprising:

- a housing;
- at least one visual output device;
- an input connector electrically coupled to the visual output device; and
- an output connector electrically coupled to the input connector, the input and output connectors being arranged relative to the housing and shaped such that the output connector can be connected to an input connector of a further modular visual output component having the same configuration with the modular visual output components abutting one another, whereby two or more modular visual output components can be joined to one another and supplied from a common power source.

In an embodiment, the input and output connectors are at opposite surfaces of the housing.

In an embodiment, one of the input and output connectors is a plug and the other is a socket.

In an embodiment, the modular visual output component is further arranged to be part of a vertical stack of modular visual output components.

In an embodiment, each at least one visual output device comprises a light source.

In an embodiment, the light source is controllable and the input connector is adapted to receive a control signal for the light source.

In an embodiment, the input and output connectors are coupled such that a control signal for the light source of a further modular visual output component can be passed from the input to the output connector.

In an embodiment, the light source is operable to output at least two colours of light.

In an embodiment, the control signal specifies at least the colour to be output.

In an embodiment, the at least one visual output device comprises a display.

In an embodiment, the modular visual output component comprises a first visual output device in the form of a display and a second visual output device in the form of at least one light source.

In an embodiment, the input connector is adapted to receive a control signal for the display.

In an embodiment, the input and output connectors are coupled such that a control signal for a display of a further modular visual output component can be passed from the input to the output connector.

In a second aspect there is provided a visual output apparatus for a gaming machine comprising:

- at least one modular visual output component, each comprising:
  - a housing;
  - at least one visual output device;
  - an input connector electrically coupled to the visual output device; and
  - an output connector electrically coupled to the input connector, the input and output connectors being arranged relative to the housing and shaped such that the output connector can be connected to an input connector of a further modular visual output component having the same configuration whereby two or more modular visual output components can be joined to one another and supplied from a common power source; and
- a controller arranged to supply control signals for each at least one visual output device to an input connector of one modular visual output component.

In an embodiment, the visual output apparatus comprises a plurality of modular visual output components connected to one another in abutting relation.

In an embodiment, the visual output apparatus comprises between 2 and 4 modular visual output components.

In an embodiment, the visual output apparatus comprises a base unit adapted to be connected to the input connector of one of the modular visual output components.

In an embodiment, the visual output apparatus comprises an intermediate trim component between each adjoining modular visual output component.

In an embodiment, the visual output apparatus comprises a cover member for covering at least the output connector of a modular visual output component furthest from the base unit.

In an embodiment, the visual output apparatus comprises the controller is programmable to specify the number of modular visual output components connected to the controller.

In a third aspect there is provided a visual output kit for a gaming machine comprising:

- at least one modular visual output component each comprising:
  - a housing;
  - at least one visual output device;
  - an input connector electrically coupled to the visual output device; and
  - an output connector electrically coupled to the input connector, the input and output connectors being arranged relative to the housing and shaped such that the output connector can be connected to an input connector of a further modular visual output component having the same configuration whereby two or more modular visual output components can be joined to one another and supplied from a common power source; and a controller adapted to supply control signals for each at least one visual output device to an input connector of one modular visual output component.

In a fourth aspect there is provided a visual output component for a gaming machine comprising:

a housing comprising at least one light transmissive portion through which light may emitted from the housing;

a display; and a light source positioned within the housing at a position where light emitted from the light source will illuminate the display and be separately emitted through at least part of the at least one light transmissive portion.

In an embodiment, the display is a reflective display and the light source is positioned to illuminate a front of the display.

In an embodiment, the display is a transmissive display and the light source is positioned to illuminate a rear of the display.

In an embodiment, the light source is positioned between the display and a reflector located within the housing, such that light emitted from the light source is reflected from the reflector to at least partially illuminate the display.

In an embodiment, the display is mounted within a recess in the housing.

In an embodiment, the housing has a substantially circular section except where the display is mounted.

In an embodiment, the housing is substantially cylindrical and comprises circular upper and lower support members with the light transmissive portion mounted therebetween.

In an embodiment, the at least one light transmissive portion comprises a lens.

In an embodiment, the visual output component comprises an input connector accessible in the region of the lower support member and an output connector accessible in the region of the upper support member.

In an embodiment, the visual output component comprises a transverse circuit board is mounted within the housing and the connectors are mounted to the transverse circuit board.

In an embodiment, the visual output component comprises the transverse circuit board is arranged to carry at least some control signals from the input connector to the output connector.

In a fifth aspect there is provided a visual output apparatus for a gaming machine comprising:

at least one visual output component, each visual output component comprising:

a housing comprising at least one light transmissive portion through which light may emitted from the housing;

a display; and a light source positioned within the housing at a position where light emitted from the light source will illuminate the display and be separately emitted through at least part of emitted through the at least one light transmissive portion;

a controller adapted to supply control signals for each display and each light source to an input connector of one modular visual output component.

In a sixth aspect there is provided a visual output kit for a gaming machine comprising:

at least one visual output component, each visual output component comprising:

a housing comprising at least one light transmissive portion through which light may emitted from the housing;

a display; and a light source positioned within the housing at a position where light emitted from the light source will illuminate the display and be separately emitted through at least part of emitted through the at least one light transmissive portion; and a controller adapted to supply control signals for each display and each light source to an input connector of one modular visual output component.

BRIEF DESCRIPTION OF SEVERAL VIEWS OF THE DRAWINGS

Certain embodiments of the invention will now be described in relation to the following drawings in which.

DETAILED DESCRIPTION OF THE INVENTION

The embodiment provides a modular visual output component that incorporates a multi-coloured light source and a display. The modular visual output component can be used to construct a visual output apparatus in the form of an improved light tower. In one embodiment, each segment of the light tower incorporates a display. The modular visual output component can be supplied as one component of a visual output kit. The visual output component enables the construction of light towers of any desired height and having any number of segments. Typically, the light towers will consist of two to four modular visual output components. Each modular visual output component has a clear or translucent lens and a multi-coloured light source which can be controlled to provide a variety of different output colours. The light sources are advantageously arranged so that they can also act as a back or front light for display when it is in the form of an LCD (liquid crystal display) or similar display. The incorporation of the LCD allows additional information to be communicated. As the light source is multi-coloured, it can be used both to provide an appropriate coloured light for illuminating an LCD and to provide a lighting colour appropriate for its position in the light tower. Further, the order of the coloured lights may be readily varied or altered.

The embodiment is described in relation to an example where a light tower is placed on a gaming machine so that lights can be lit in response to the operating state of the machine such as a fault or a security breach or in response to a player request for a personal service such as collecting a jackpot payout or ordering a beverage. Persons skilled in the art will appreciate that in the case of a gaming machine, most aspects of the game are implemented on the game machine although functions such as a jackpot function may be implemented on a remote server when a gaming machine is part of a gaming network.

A person skilled in the art will appreciate that in server based gaming, a player may operate an interactive video terminal rather than a gaming machine to play the game. The interactive video terminal acts a client and implements some parts of the game, such as output of images to the display and receipt of gaming instructions from buttons or a touch screen while other aspects of the game are implemented on a gaming server. A person skilled in the art will appreciate that light towers can also be applied to such interactive video terminals.

Figure 1:
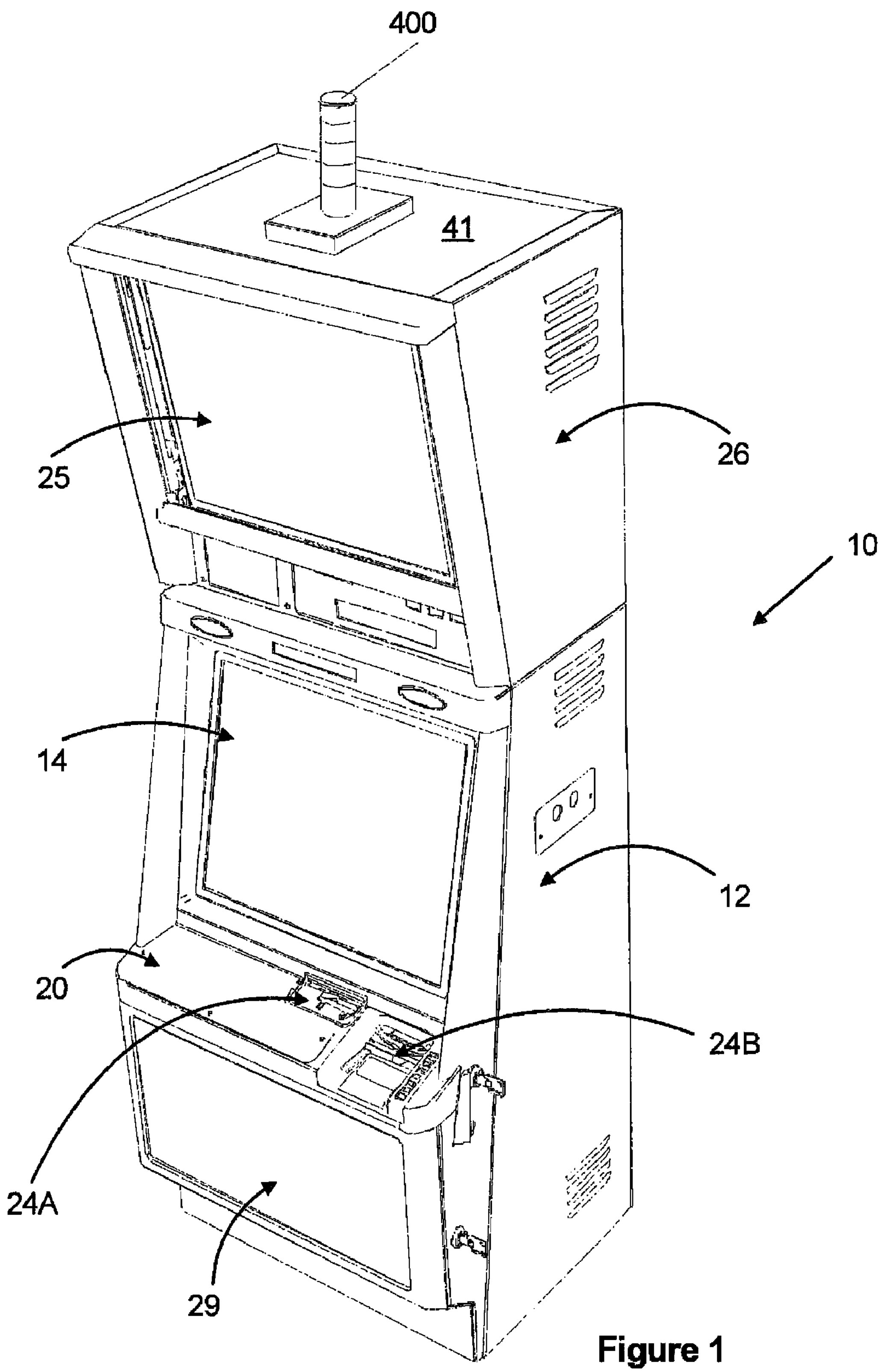
FIG. 1 is a perspective view of a gaming machine.

A gaming system in the form of a stand alone gaming machine 10 is illustrated in FIG. 1. The gaming machine 10 includes a console 12 having a display 14 on which is displayed representations of a game 16 that can be played by a player. A mid-trim 20 of the gaming machine 10 houses a bank of buttons for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

Figure 2:
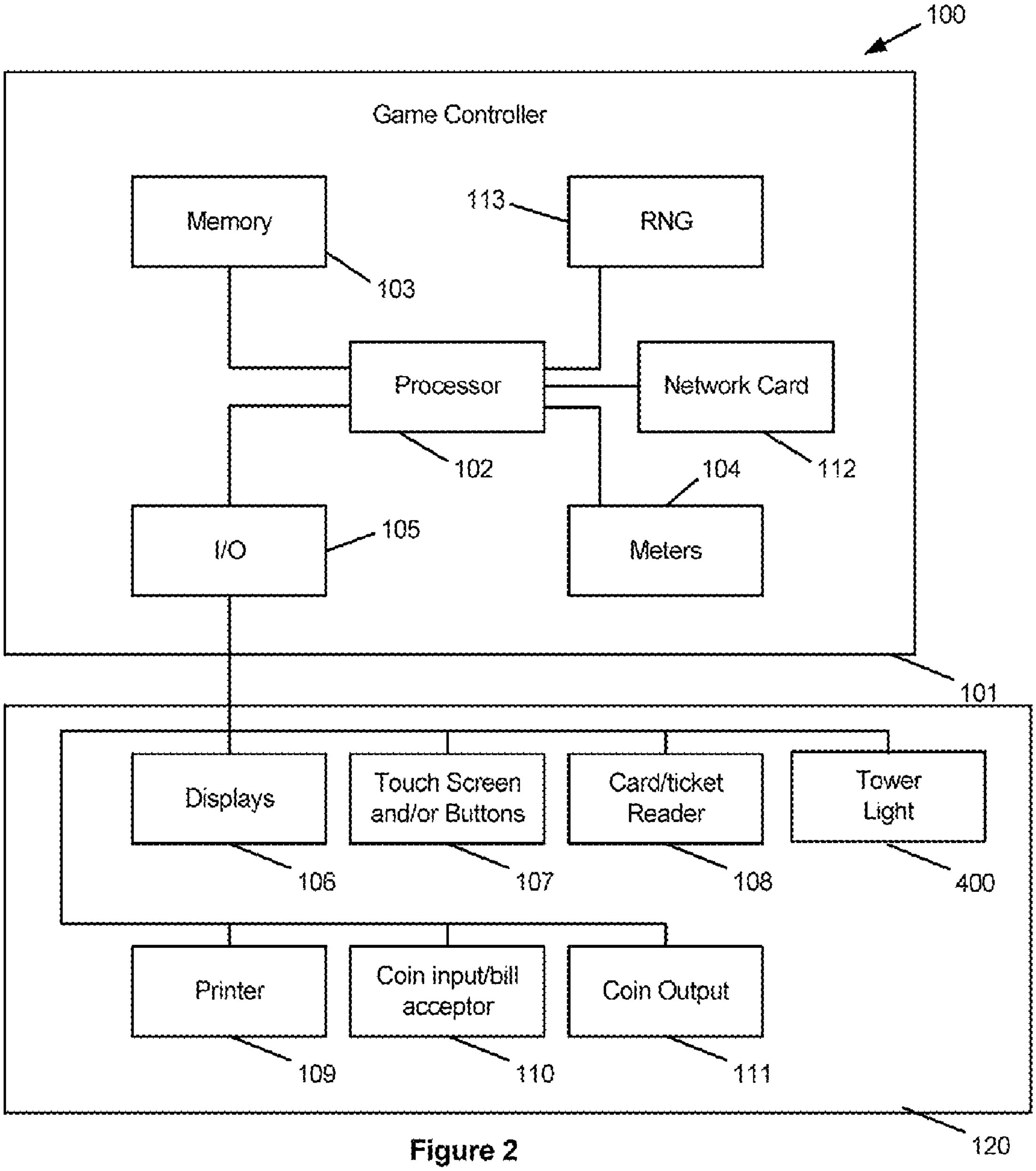
FIG. 2 is a block diagram of the functional components of a gaming machine.

The top box 26 has a display for example a video display unit, which may be of the same type as the display 14, or of a different type. The displays 14 and 25 shown in FIG. 2 are in the form of a video display unit, particularly a cathode ray tube screen device. Alternatively, the display 14 may be a liquid crystal display, plasma screen, any other suitable video display unit, or the visible portion of an electromechanical device.

The gaming machine 10 has a tower light 400 mounted to the top surface 41. FIG. 2 shows a block diagram of operative components of a typical gaming machine which may be the same as or different to the gaming machine of FIG. 1.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 2, a player interface 120 includes peripheral devices that communicate with the game controller 101 comprise one or more displays 106, a touch screen and/or buttons 107, a card and/or ticket reader 108, a printer 109, a bill acceptor and/or coin input mechanism 110, a coin output mechanism 111 and a light tower 400. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 3:
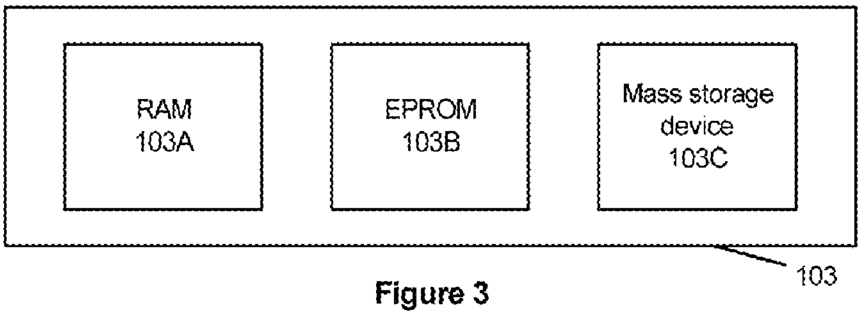
FIG. 3 is a block diagram representing the structure of a memory.

FIG. 3 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

The embodiment is adapted to replace the prior art of a light tower comprised of multiple segments and monochrome lenses each illuminated by a filament lamp. Each modular visual output component has a light transmissive portion of the housing in the form of a substantially clear or translucent lens that is illuminated by at least one multi-coloured light source. The lens is substantially clear or translucent in the sense that it is a substantially untinted optical element such there will be no significant change to colour balance as light passes through it.

The multi-coloured light source may be a multicoloured LED (light emitting diode). Hence the visual output component can be electrically programmed to emit an appropriate colour rather than it being necessary to produce a light of the correct colour and mechanically manipulate the light segments to be in the correct order to provide the desired visual communication scheme. The addition of a display allows communication in the form of the display of text or other graphic messages, when the multi-coloured light source is illuminated. In other words, the display of the illuminated component confers specific messages and functions. Thus, a service attendant who was unfamiliar with the meaning of a particular coloured light component does not have to approach the central diagnostic system to determine what message is conferred by that light.

Further, each modular visual output component is designed to operate independently and as such is adapted with interlocking connectors at both ends of the segment that allow ease of replacement and scalability. As described in further detail below, one or more light sources may act as a back light for the LCD. The lights may be placed in front or to the side of the display if the LCD is a reflective LCD rather than a transmissive LCD.

Figure 4:
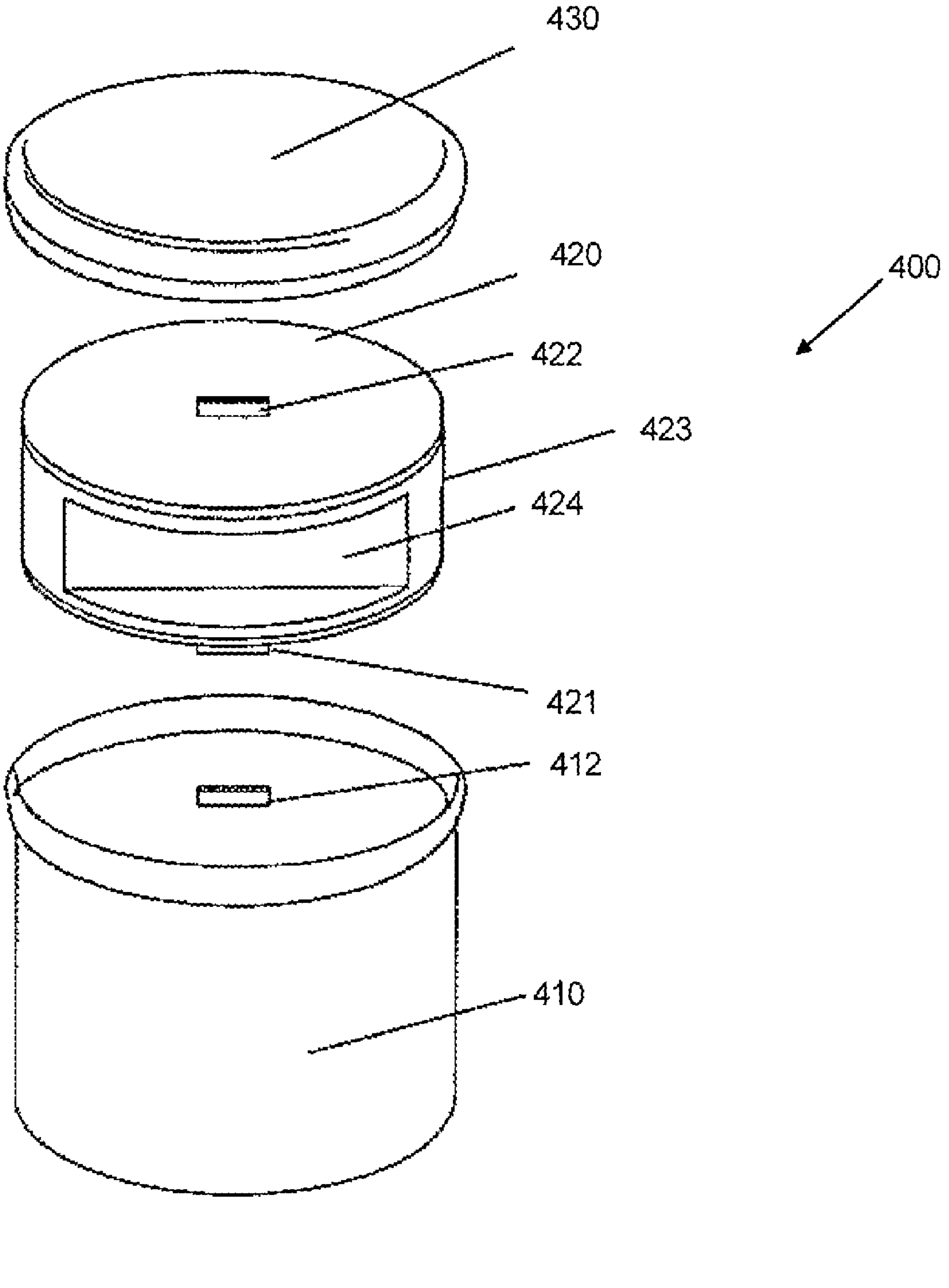
FIG. 4 is an exploded perspective view of visual output apparatus.

Referring to FIG. 4 there is shown a light tower 400 that has one modular visual output component 420.

The modular output component 420 has a lower input connector 421, an upper output connector 422, a lens 423 and a display 424. The light tower has a base unit 410 with an upper output connector 412 such that when the input connector 421 is in inserted into the output connector 412, control signals and power can be supplied to the modular visual output component 420. An upper cover 430 is used to provide an aesthetic cover to the modular visual output component 420 and complete the top of the tower. A person skilled in the art will appreciate that rather than providing a base unit, it would be possible to provide a connector in an upper surface of a gaming machine to which the light tower is to be mounted. Further, in FIG. 4 and throughout the specification all upper connectors 412, 422 are shown as sockets and all lower connectors 421 as shown as plugs. A person skilled in the art will appreciate that the plug and socket can be reversed and also that different types of connectors can be used. An advantage of the plug and socket connectors shown in FIG. 4 is that they provide both electrical and mechanical connection.

Figure 5:
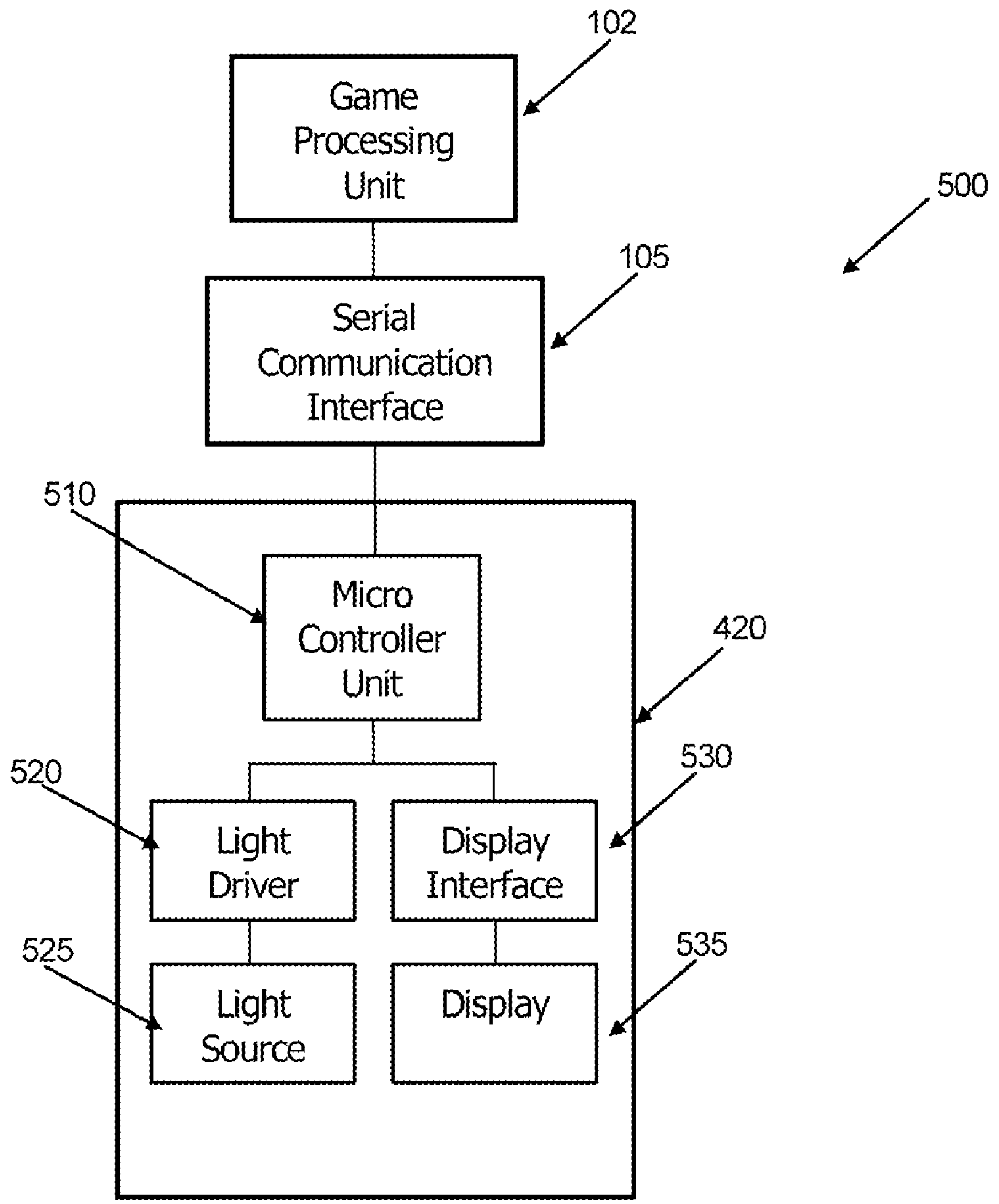
FIG. 5 is a block diagram of a visual output apparatus.

Referring to FIG. 5, a controller for a modular visual output component 400 is provided by the game processing unit 102 which outputs control signals via the serial communication interface. These control signals are based on routines executed by the game processing unit to monitor for faults, security breaches or particular player requests. A person skilled in the art will appreciate that these routines could be implemented as hardware, for example by a dedicated circuit, rather than software running on the game processing unit 102.

The modular visual output component has a microcontroller unit 510 that interprets the signals and when it determines that the control signals relate to it, it either controls the light driver 520 to control the light source 525 or the display interface 530 to control the display 535. A person skilled in the art will appreciate that the connectors 421 are multi-pin connectors. Some of the pins carry power (typically two) and other pins carry control signals.

Figure 6:
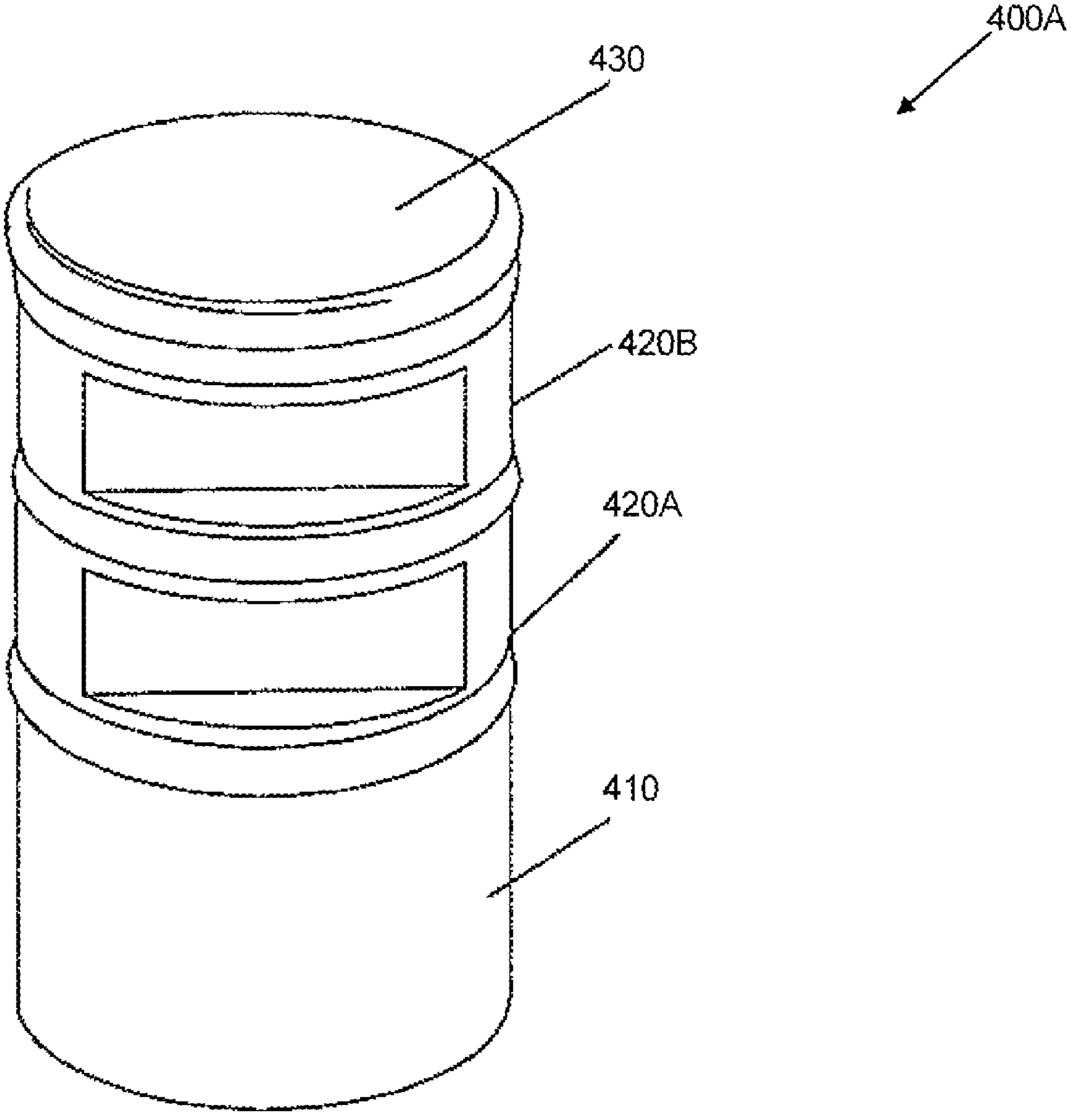
FIG. 6 is a perspective view of a further visual output apparatus.
Figure 7:
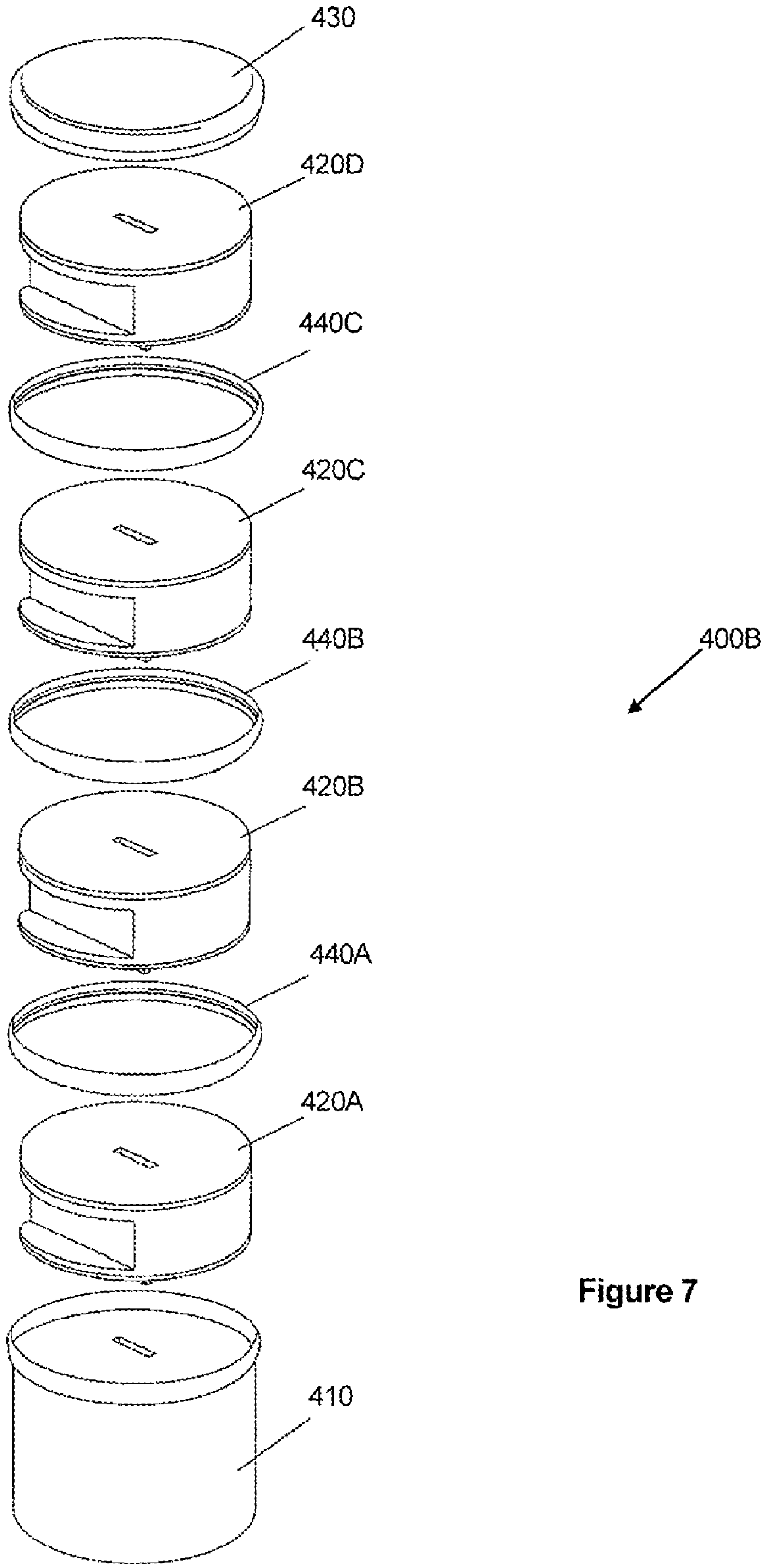
FIG. 7 is an exploded perspective view of a further visual output apparatus.

FIGS. 6 and 7 show two alternate light towers 400A, 400B that can be constructed in accordance with the embodiment. Light tower 400A has two modular visual output components 420A, 420B and light tower 400B has a four modular components, 420A, 420B, 420C, 420D.

FIG. 7 shows that an intermediate trim 440 is provided between each abutting pair of modular components 420 to enhance the visual appearance of the light tower 400B, 400A. Thus light tower 400B has three intermediate trims 440A, 440B, 440C.

It will be appreciated from the above that the embodiments of the present invention can be provided in a kit form where a kit comprised of an upper cover, a base unit, one or modular components, and one or more intermediate trims can be provided in order to be formed into a light tower of desired configuration. The controller can be provided, for example, in the form of control software to execute on the processor 102.

Figure 8:
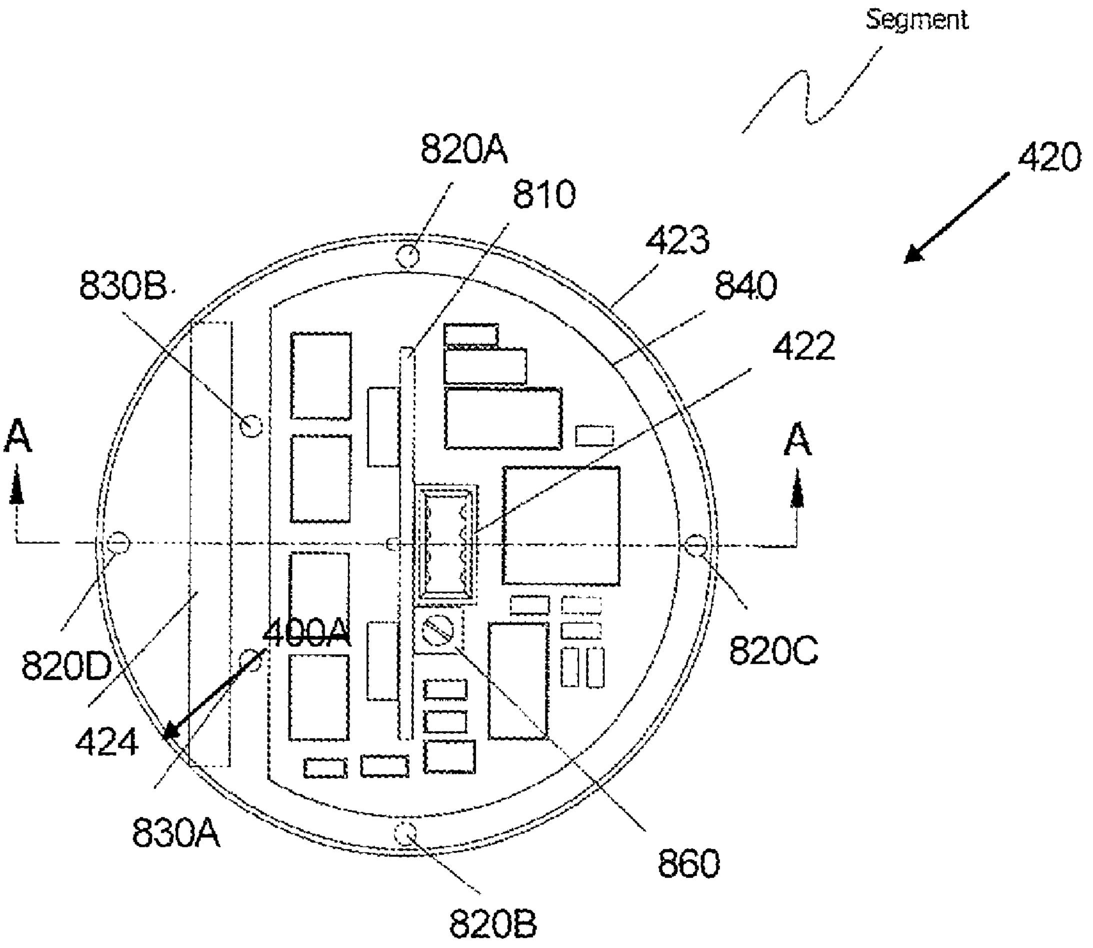
FIG. 8 is a plan view of a visual output component without the upper printed wiring board.
Figure 9:
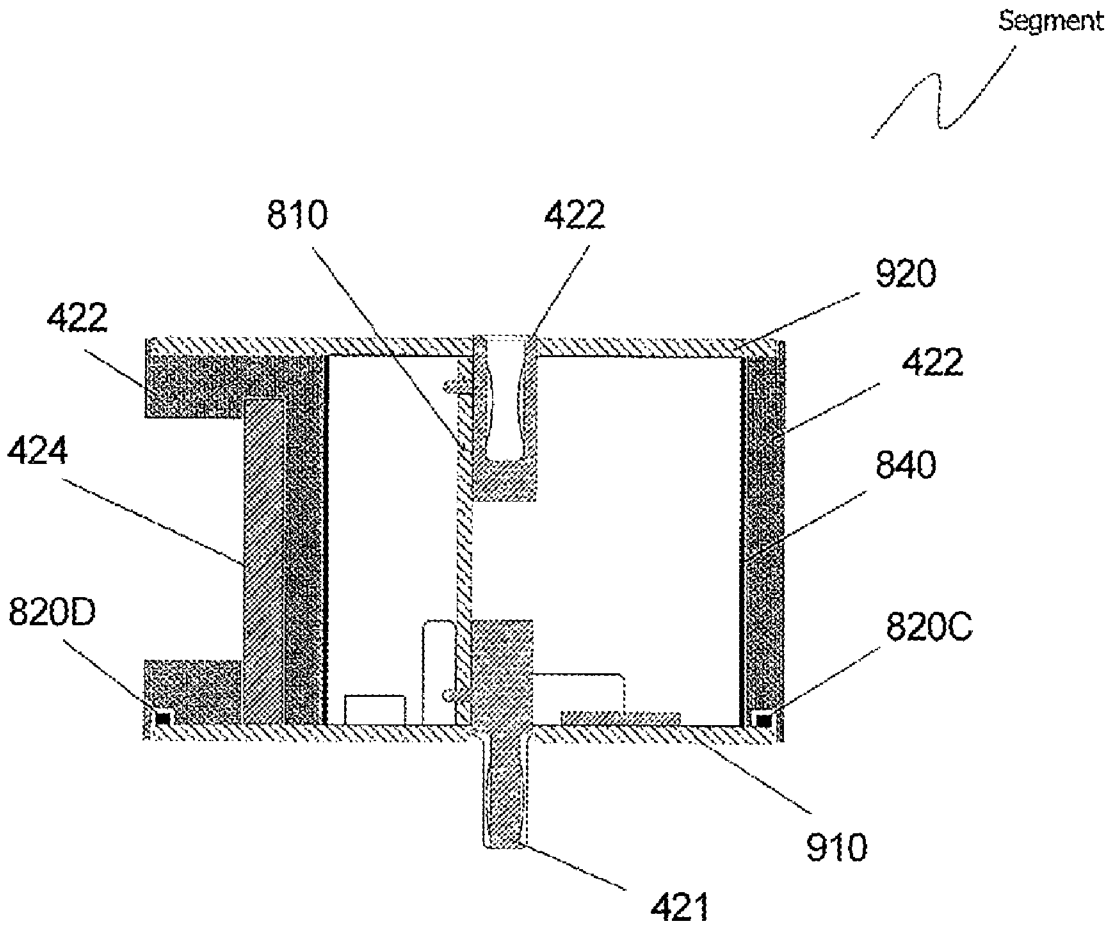
FIG. 9 is a side sectional view of the segment of FIG. 8 but with the upper printed wiring port.

Further details of each modular component 420 are provided in FIGS. 8 and 9. FIG. 8 is a plan view of a modular component 420 with the upper printed wiring board.

The modular component 420 has a substantially cylindrical lens 423 with a recess that accommodates and a layer of thermoplastic material 840 that diffuses the illumination of a light source 820, 830. In other words, the lens acts as a light dispersing optical element. Each light source 820, 830 is a multi-colour light emitting diode (LED). The modular component is electrically programmable to provide any colour of illumination to match a game venue or a game theme. Although six light sources 820, 830 are transposed across a segment, each light source can be independently operated to provide specific illumination intensity and colour patterns.

The reflective medium 840 disposed around the inner portion of the lens acts as a light reflector which facilitates visibility and improved intensity of the illumination whenever any one of the light sources is energised. Secondly, the light reflector 840 can also act as a backlight to a transmissive LCD For instance, the two inner light sources 830 provided behind the display are adapted to improve the viewing for a transmissive LCD. Similarly, a light source 820D disposed at the front portion of the lens is adapted to provide a front light for a reflective LCD: this significantly enhances viewing in dimly lit environments. The light sources disposed at the rear 820C and side portions 830A, 830B of the lens provide an angular visibility of the segment, when the visual indicating device is mounted on top of a gaming machine and viewed from a distance.

A transverse printed circuit board (PCB) 810 is disposed across the centre portion of the modular component to provide a mechanical support for the upper connector 422 and the lower connector (not shown in FIG. 8). The PCB 810 also provide an electrical connection between the upper output connector 422 and a game processing unit 102 that resides in a gaming machine, so that signals (and power) can be supplied to a further modular component.

An encoder 860 disposed at the upper portion of the transverse PCB 810 is adapted to provide an identity or address mechanism for an individual modular component 420 in a light tower that has more than one modular component 420. The encoder 860 may be a mechanically encoded switch or an electrically programmable read only memory such as PROM, EPROM, EEPROM, or flash memory. An application program designed to configure the operational aspect of a light tower having a plurality of segments is able to recognise and to configure the functionality of individual modular components while in the set up or normal operating mode. During set up, the application program automatically polls the light tower to detect an address code from each of the modular components 420 and allocate an appropriate address code, if electrical programmable memory is used. The application program will notify of any conflicting address codes among the modular components 420 if a mechanical encoded switch is used. Thus, allowing a competent technician to reset the address code previously set on each of the encoded switches.

FIG. 9 is a cross-section through line A-A of FIG. 8. Display 424 is disposed in front of a recessed portion 423A of the cylindrical lens 423. A light source 820D disposed at the front end of a lower PCB is adapted to provide a front lighting for a reflective LCD. Two inner lights sources (not shown on the drawing) disposed at the front portion of the lower PCB adjacent to the rear of the display are adapted to provide back lighting for a transmissive LCD. The reflective medium 840 surrounding the inner portion of the lens 422 is adapted to act as a light reflector that facilitates to disperse the illumination from the light sources 820, 830 to enhance visibility from a distance.

Figure 10:
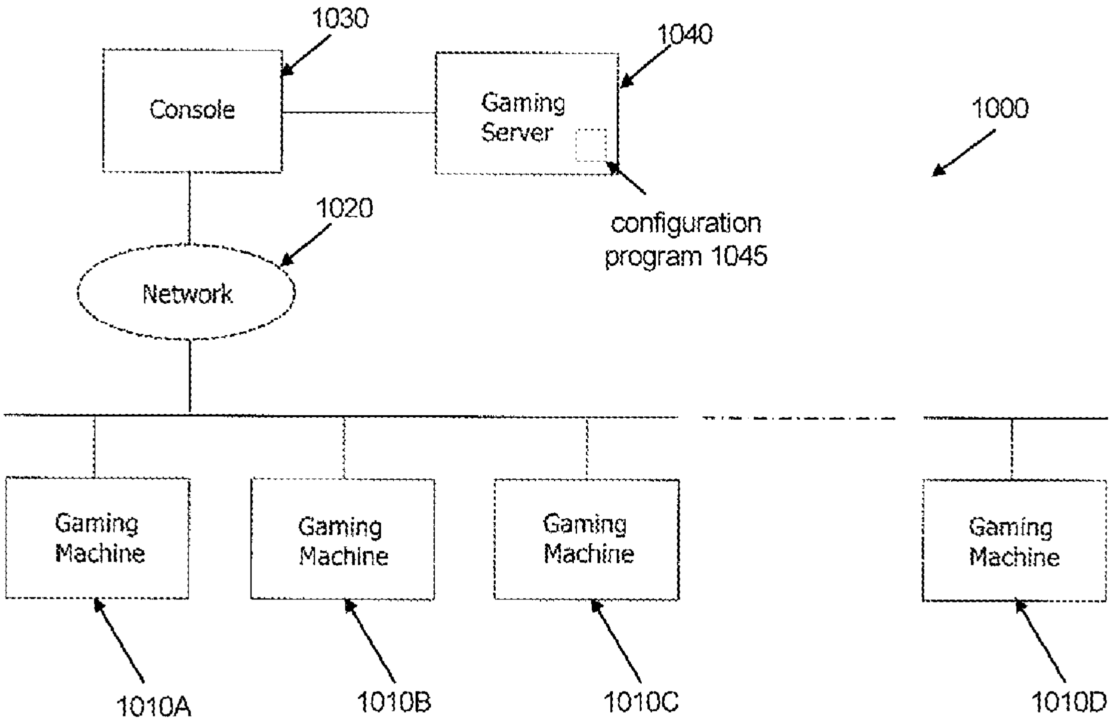
FIG. 10 is a block diagram showing how visual output apparatus can be set up in a gaming network.

FIG. 10 illustrates an operating system for setting up light towers in a gaming venue. The operating system may include a network 1020, operatively interfaced between a console 1030 and a plurality of gaming machines 1010. The network may be a local area network (LAN) with interconnectivity provided by cables such as Ethernet or the like, or wireless connectivity such as IEEE 802.11 wireless LAN or the like. The console may be a smart terminal, personal computer, workstation, or the like.

The configuration program 1045 resides in a gaming server 1040, designed to configure the operational aspect of the light tower. When the program 1045 is executed, a table or menu is displayed on a screen of a console which allows authorised personnel of a gaming venue to program and to configure the functional features or themes for the light towers through the network. The program 1045 is adapted to detect and to communicate with individual modular components of each light tower mounted on a gaming machine, irrespective of the number of components. As described above, the modular component has an encoder that provides a unique address code. A machine specific configuration program containing the operational aspect is generated from the gaming server 1040 and downloaded to a flash memory device that resides on a game processing unit 102 of a gaming machine 100, upon completion of the configuration setup and exiting the configuration program 1045. There is a provision in the program 1045 to conduct a mass change or set-up all the light towers at the gaming venue in a single step.

However, in an alternative embodiment of setting up or reprogramming, the application program may be embedded in the game processing unit of the gaming machine. Thus, the programming can be performed through a touch sensitive screen such as the video display monitor or the player input means such as the push button switches, on the gaming machine.

Furthermore, in another alternative embodiment, the setting up or reprogramming may be performed with a handheld, portable wireless device. The game processing unit that resides in the gaming machine will also be equipped with a wireless communication adaptor to interact with the portable wireless device during set up, and to receive the download of the configuration program upon completion of the setting up. The configuration program will be stored in a flash memory transposed on the game processing unit.

A person skilled in the art will appreciate that a number of variations may be made to the invention without departing from the scope and spirit of the invention described herein. For example, rather than a liquid crystal display it may be possible for the display to be formed from another display technology of appropriate size such as by employing an OLED, (organic light emitting diode). Further, while in the embodiment it has been described that all the lights 820, 830 are multi-coloured, those lights that are dedicated to providing a backlight function 820 may be a colour that is better suited to acting as a backlight. Further, the control circuit may control the multi-coloured lights to lights separately, for example, all lights may initially be lit with the colour appropriate to the modular component, then the backlight lights may be switched to white light or similar by pressing of a function button on the gaming machine to illuminate the message.

The above embodiment has been described in relation to the case where each modular component 420 incorporates both a display and at least one light source. A person skilled in the art will appreciate that some benefits of certain embodiments of the invention may be obtained by providing modular components that have only one of a light source or a display. Thus, perhaps only one of a set of four modular components would have a display.

The above embodiment has been described in relation to producing a vertical light tower. A person skilled in the art will appreciate that a light tower may be formed into other shapes, for example it may be formed by a set of horizontally connected block shaped component or components arranged to be connected to form an arch while still maintaining the modularity of certain embodiments of the present invention. A person skilled in the art will also appreciate that various different connector locations are achievable while maintaining the modularity of certain embodiments of the present invention. Other modifications will be apparent to the skilled person.

In the claims which follow and in the preceding description of embodiments of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art in any country.

The invention claimed is:

1. A modular visual output component for use with a gaming machine, the modular visual output component being interconnectable with another modular visual output component, the gaming machine having a processing unit for generating electrical control signals which (1) specify either said modular visual output component or the another modular visual output component and (2) specify a color of light or a particular visual text, the another modular visual component including a housing having a bottom surface, the modular visual output component comprising:

- a housing, said housing having a top surface and a bottom surface, the top surface being arranged in a spaced apart relationship to said bottom surface;
- a first visual output device comprising (1) a first light source operable to emit one of a plurality of colors of light and (2) a text display operable to display visual text;
- a microcontroller configured (1) to receive the electrical control signals generated by the processing unit of the gaming machine, and (2) to interpret said electrical control signals to separately operate said first light source to emit a color of light or operate said text display to display a particular visual text;
- a first input connector located on said bottom surface of said housing of the modular visual output component, said first input connector electrically coupled to said microcontroller and configured to receive the electrical control signals generated by the processing unit of the gaming machine to control the output color of said first light source; and a first output connector located on said top surface of said housing of the modular visual output component and being electrically coupled to said first input connector, said first output connector configured to connect to a second input connector located on the bottom surface of the another modular visual output component to provide the electrical control signals generated by the processing unit of the gaming machine to the second input connector of the another modular visual output component so as to control the output color of a second light source of the another visual output component.

2. A modular visual output component as claimed in claim 1, wherein said top surface being arranged on the housing of the modular visual output component in an orientation symmetrically opposite to the orientation of said bottom surface of the housing of the modular visual output component.

3. A modular visual output component as claimed in claim 1, wherein one of said first input and said first output connectors is a plug and the other is a socket.

4. A modular visual output component as claimed in claim 1, and further comprising a display.

5. A modular visual output component as claimed in claim 4, wherein the processing unit of the gaming machine generates electrical display control signals, and wherein said display is controllable by the electrical display control signals generated by the processing unit of the gaming machine to display visual text, and the first input connector is configured to receive the electrical display control signals.

6. A modular visual output component as claimed in claim 5, wherein the first input connector of the modular visual output component passes said electrical display control signals to said first output connector.

7. A visual output apparatus for a gaming machine, the gaming machine having a processing unit for generating electrical control signals which (1) specify a modular visual output component and (2) specify a color of light or a particular visual text, the visual output apparatus comprising:

a plurality of modular visual output components, each said modular visual output component comprising:

a housing, said housing having a top surface and a bottom surface, the top surface being arranged in a spaced apart relationship to said bottom surface;

a first visual output device comprising (1) a first light source operable to emit one of a plurality of colors of light and (2) a text display operable to display visual text;

a microcontroller configured to receive the electrical control signals generated by the processing unit of the gaming machine, and (2) to interpret said electrical control signals to separately operate said first light source to emit a color of light or operate said text display to display a particular visual text;

a first input connector located on said bottom surface of said housing, said first input connector electrically coupled to said microcontroller and configured to receive the electrical control signals generated by the processing unit of the gaming machine to control the output color of said first light source; and a first output connector located on said top surface of said housing and being electrically coupled to said first input connector, said first output connector configured to connect to a said second input connector located on said bottom surface of said housing of another modular visual output component of said plurality of modular visual output components to provide the electrical control signals generated by the processing unit of the gaming machine to said second input connector of said another modular visual output component so as to control the output color of a said second light source of said another modular visual output component.

8. A visual output apparatus as claimed in claim 7, wherein said plurality of modular visual output components are connected to one another in an abutting relation.

9. A visual output apparatus as claimed in claim 7, wherein said plurality comprises between two and four modular visual output components.

10. A visual output apparatus as claimed in claim 7, comprising an intermediate trim component disposed between two modular visual output components.

11. A visual output apparatus as claimed in claim 7, and further comprising a cover member covering an output connector of a modular visual output component.

* * * * *

UNITED STATES PATENT AND TRADEMARK OFFICE

CERTIFICATE OF CORRECTION

PATENT NO. : 8,075,408 B2
APPLICATION NO. : 12/057114
DATED : December 13, 2011
INVENTOR(S) : Hwang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 523 days.

Signed and Sealed this
Tenth Day of April, 2012

David J. Kappos
*Director of the United States Patent and Trademark Office*